Aug. 21, 1951 W. A. ERNST 2,564,887
MOTOR-OPERATED BEVERAGE MIXER AND WHIPPER
Filed July 25, 1949 2 Sheets—Sheet 1

Inventor
W. ARTHUR ERNST
By Wheeler, Wheeler & Wheeler
Attorneys

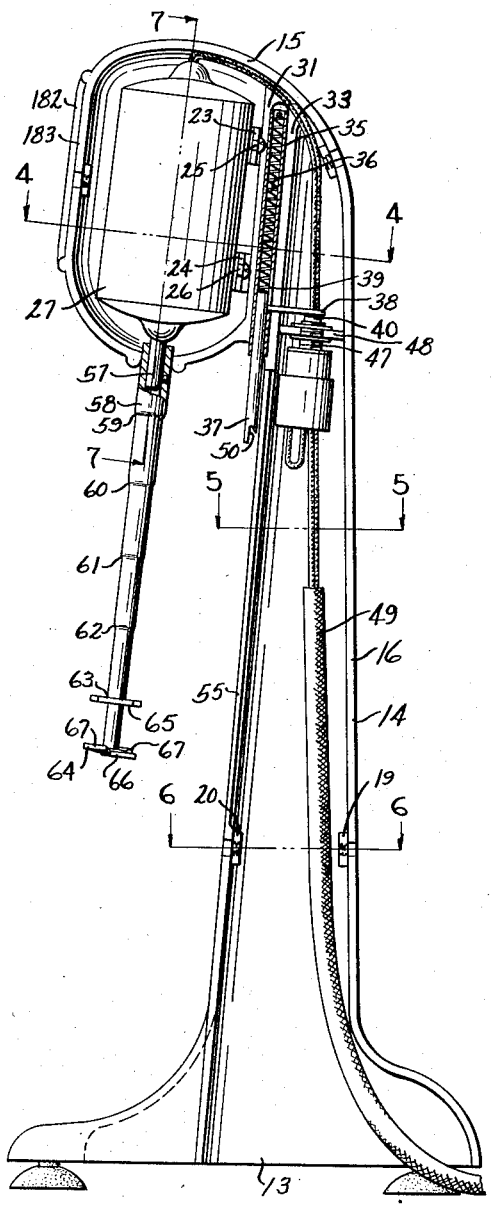
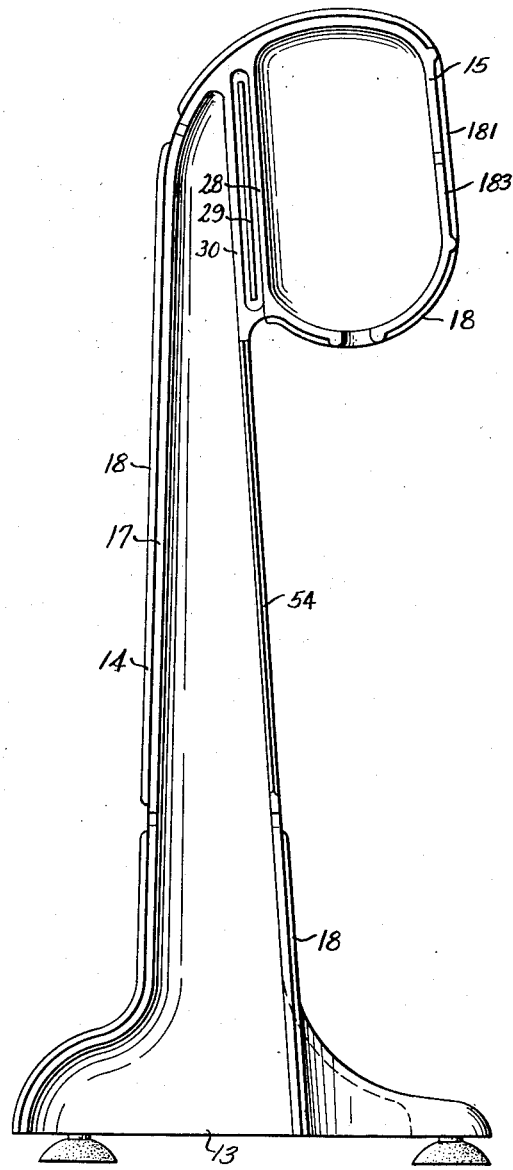
Fig. 2
Fig. 3
Inventor
W. ARTHUR ERNST

Patented Aug. 21, 1951

2,564,887

UNITED STATES PATENT OFFICE 2,564,887

MOTOR-OPERATED BEVERAGE MIXER AND WHIPPER

W. Arthur Ernst, Racine, Wis.

Application July 25, 1949, Serial No. 106,616

14 Claims. (Cl. 259—108)

This invention relates to a motor-operated beverage mixer and whipper.

It is one of the important objects of the invention to provide a device of the character described in which the material acted upon is not merely mixed, but thoroughly whipped, so that the air bubbles incorporated therein by the whipping operation will cause the material to continue to expand in volume, regardless of the length of time for which the whipping operation is conducted, instead of collapsing, as is a common experience in the use of conventional malted milk mixers and the like.

It is a further very important object of the invention to provide a construction minimizing labor cost. More specifically, the invention contemplates a motor enclosed by a shell comprising component parts which are integral with corresponding parts of the base and standard, the arrangement desirably being such that all of the mechanism, even including the motor, can be mounted on one of the component parts of the shell and enclosed by the other, all such mechanism being fully exposed until the enclosure is completed by the assembly of the parts of the shell.

It is a further important object of the invention to provide a device of this character in which the rim of the receptacle which holds the material to be mixed can control the switch that governs the mixing operation, such control being effected in a manner which enables a variety of different sizes of receptacles to be employed, and which does not involve any substantial pressure on the rim of the receptacle, whereby it is even possible to use paper receptacles without injury to the rims thereof.

Other specific objects of the invention will be apparent from the following disclosure thereof with particular reference to the accompanying drawings, wherein:

Fig. 2 is a view in side elevation of the operating parts of the apparatus assembled in one of the component parts of the shell.

Fig. 3 is a view in side elevation of the complementary component part of the shell which, attached to the assembly shown in Fig. 2, completes the device.

Fig. 4 is a view taken in section transversely through the upper portion of the housing of the assembled device in the plane indicated at 4—4 in Fig. 2.

Fig. 5 is a view taken in section through the assembled device with a receptacle fragmentarily illustrated in association therewith, the plane in which the view is taken being indicated at 5—5 in Fig. 2.

Fig. 6 is a view taken in section through the assembled device in the plane indicated at 6—6 in Fig. 2.

Fig. 7 is a view taken in section through the assembled housing in the plane indicated at 7—7 in Fig. 2, the motor being omitted.

Fig. 8 is an enlarged sectional detail view of the type of switch desirably used in connection with the apparatus.

Fig. 9 is an enlarged fragmentary detail view taken in vertical section through a receptacle in which the whipping buttons are operated, the flow induced by such buttons being diagrammatically illustrated.

Fig. 10 is a side elevation of the shaft and whipping buttons, portions being shown in section.

Fig. 11 is a bottom plan view of the shaft and buttons.

Figure 1:
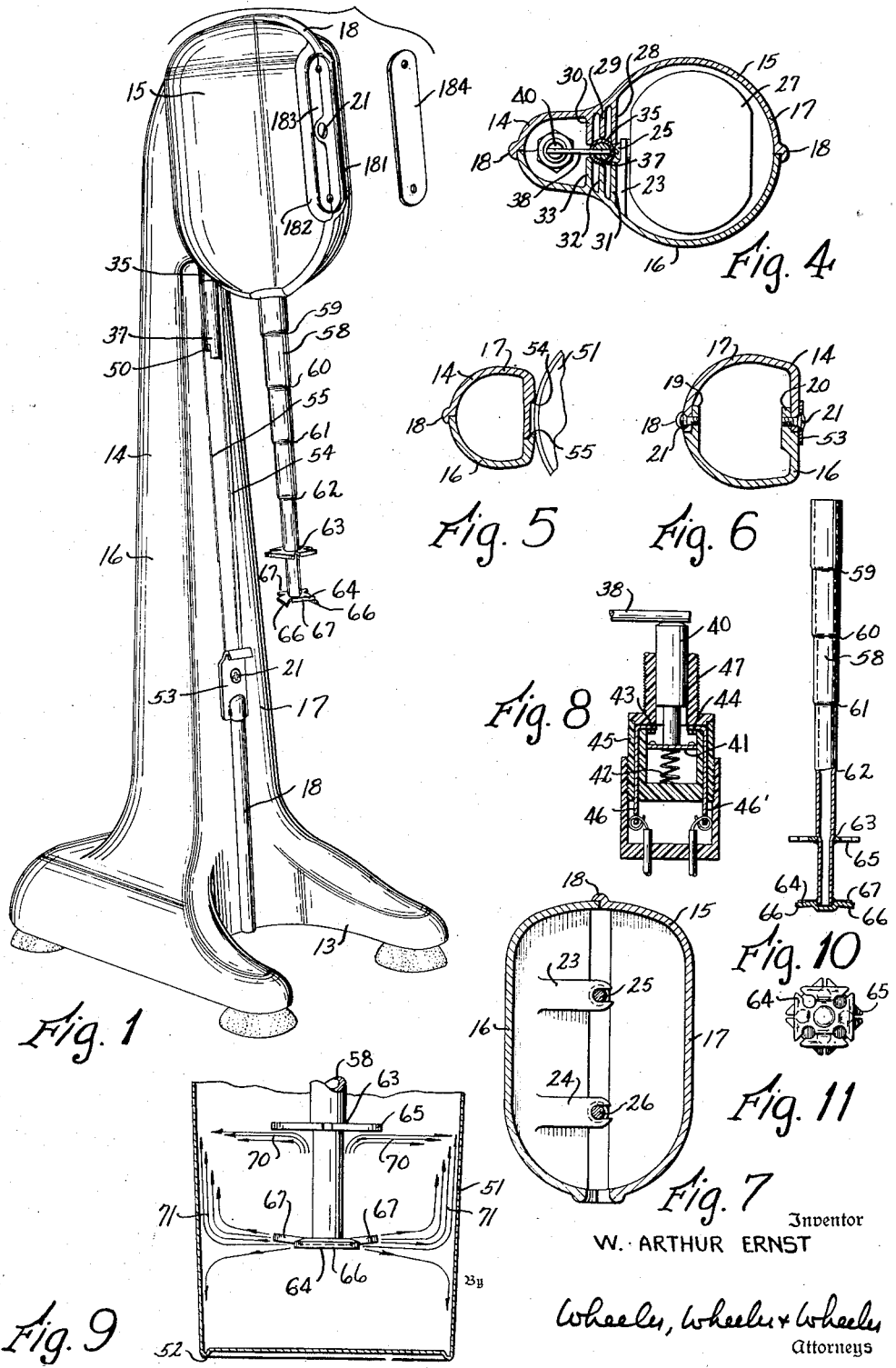
Fig. 1 is a view in perspective of assembled apparatus embodying the invention, only the name plate being shown in a disassociated position.

The shell 12 of the device unitarily includes a base 13, a column 14, and a motor housing 15. The shell is preferably made up by two complementary parts 16 and 17 which are separately illustrated in Figs. 2 and 3 respectively. As indicated in the transverse sectional views, Figs. 4, 5 and 6, the parts 16, 17 have mating margins such as can be made by forming a bead 18 on one of the parts which overhangs the margin thereof to provide a shoulder within which the margin of the complementary part of the shell may seat. The innermost part may be provided with lugs at 19, 20 (Figs. 2 and 6) to receive screws 21 which have their heads engaged with the other part. In the device as shown, only four screws are required to maintain the parts in assembly, two screws being disposed oppositely in the column, and two connecting the parts at the rear top portion of the column and at the front of the motor housing.

I may provide an offset of the bead 18 at 181 and a complementary offset bead 182 on the other part of the shell, the two bead portions 181 and 182 defining a shallow channel at 183 in which a name plate or the like as shown at 184 in Fig. 1 may be mounted.

As indicated above, it is desirable that all of the operating and control mechanism be mounted in one of the two parts of the shell. By way of exemplification, I have shown all such mechanism mounted in the part 16 of the shell, as best illustrated in Fig. 2. Formed integrally with the component part 16 of the shell and disposed within the motor housing portion thereof are the apertured or slotted arms 23, 24 which receive screws 25, 26 supporting the electric motor 27. Immediately behind the arms 23, 24, the component parts of the shell provide means which may constitute inwardly projecting webs 28, 29, 30, 31, 32 and 33, the first three webs being connected to the shell part 17, and the last three webs being connected to the shell part 16. The intermediate webs of each seat have a lesser inward projection than the first and third webs of such seat, whereby the several webs together provide a pocket for the switch actuator guide tube 35. In such tube, a light compression spring 36 is confined, and its pressure is exerted downwardly on the switch actuating plunger 37.

An arm 38 connected with the plunger and projecting laterally therefrom through a slot 39 in the guide tube 35 is biased by the spring to press the switch button 40 to urge to its open position the contactor 41 of the switch. When relieved of the bias of the spring 36 as transmitted to it by the arm 38, the switch closes under the bias of its own spring 42 which causes the contactor 41 to engage the contacts 43 and 44 which project from the dielectric shell 45 of the switch. In closing, the switch contactor 41 completes a circuit between the terminals 46 and 46' in the current supply line leading to the motor 27. The switch as a whole is conveniently mounted by disposing its threaded mounting stem 47 in the slot of a bridge wall 48 in the shell part 16 as shown in Fig. 2.

It will be understood that the switch is self-closing, but is normally held open due to the fact that the bias of spring 36 somewhat exceeds the bias of the switch spring 42. The range of movement of the switch contactor 41 is, as shown in Fig. 8, extremely short, but little movement being required to close the switch from the open position in which it is illustrated. Consequently, only about one-eighth of an inch of upward movement of the actuating plunger 37 is sufficient to close the switch and yet, the actuating plunger is permitted a very considerably greater range of movement, the spring 35 being relatively a long one which exerts but light pressure on the plunger 37 throughout the range of operation permitted it by the slot 39 in the guide tube 35.

The electrical supply cord 49 leading to the motor 27 is conventional in that it comprises a pair of mutually insulated wires, one of which is cut, and the ends connected to the terminals 46, 46' to enable the motor operation to be controlled by the switch 45 as opened and closed by plunger 37.

With all of the mechanism assembled in the part 16 of the shell as shown in Fig. 2, the complementary shell part 17 is applied, and the two parts are screwed together, leaving the device in condition for use. The assembly can be completed at a minimum of cost, since the mechanism is fully exposed, and the wiring can even be completed before the motor and switch are mounted.

The lower end of plunger 37 is notched at 50 to receive the upper margin of a receptacle 51. Practically all receptacles have a lower marginal flange or chine 52 (Fig. 9) such as can be supported by a clip 53 held to the standard portion of the shell by one of the screws 21. Above this clip, the shell bead is desirably omitted, and the two parts of the shell are shouldered at 54 and 55 so that the engagement of the receptacle therewith tends to steady or position the receptacle. The pressure required to transmit motion from the upper margin of the receptacle to the notched lower end of the plunger 37 for the operation of the switch is so slight that a paper cup can readily be used as a receptacle. Moreover, there is no abrupt resistance at any point to the insertion of the receptacle, since the range of movement of plunger 37 is sufficient to enable quite a wide range of cup sizes to be used on the device, the margin of the cup, in each instance, raising the plunger as the receptacle is positioned on the clip 53 which supports it for the operation on its contents.

As soon as the receptacle is in course of mounting and has slightly lifted plunger 37, the motor circuit is closed, and the motor commences to operate. The motor armature shaft 57 carries a tubular mixer shaft 58 which, for the purposes of the present invention, has a stepped external periphery, being provided with rather abrupt shoulders at 59, 60, 61, 62 and 63. At or near the lower end of such shaft is mounted the mixing or beating button 64. Directly above it is a similar button 65. Each button has the general outline of a Maltese cross as shown in Fig. 11. However, the wings or vanes of the button 65 are desirably made to lie in the same plane, whereas the wings or vanes of the button 64 are bent oppositely, two opposite vanes being bent downwardly as shown at 66, and the remaining vanes being bent slightly upwardly as indicated at 67 in Fig. 9. The offset or deflection is very slight, being .031 inch in actual usage. In operation, the button 64 produces an outward flow of the material upon which it acts. Such material, at the time of interaction of the button therewith, is near the bottom of the receptacle 51, and consequently, the stream set in motion by the button 64 turns upwardly along the side walls of the receptacle and would cascade over the top of the receptacle were it not broken up by a movement of horizontal streams or generally planiform movements of liquid from the button 65 and the successive shoulders provided at 62, 61, 60 and so forth in the shaft 58. The stream delivered centrifugally in all directions by the button 65 will naturally be the most well-defined and rapidly moving of these various currents. As indicated by the arrows at 70, this stream or current moves out laterally toward the wall of the cup where it engages the upwardly moving currents indicated by arrow 71 and above described. At the level at which these currents interact, very pronounced turbulence occurs, and the same is true in progressively lessening degree at the levels of the several shoulders from which material moves centrifugally outwardly.

The material would tend to follow upwardly along the shaft but for such shoulders, which interrupt any upward coursing of the material and throw the material sharply outwardly to the wall of the receptacle.

The combined action of the buttons, the shoulders of the shaft, and the receptacle wall produces the desired whipping of the material, the effect thereof being distinct and different from the mere mixing achieved in the usual malted milk mixer or like appliance.

I claim:

1. In a device of the character described, the combination with a motor provided with an armature shaft and an extension tool connected therewith, of a motor switch having wiring for the control of said motor, a shell unitarily providing a motor housing and a standard, the said shell comprising two complementary parts, one of which has a motor mounting upon which the motor is operatively disposed and a switch mounting upon which the switch is operatively carried, the other said part comprising a closure for the part first mentioned, the respective parts having opposed complementary surfaces together constituting an actuator chamber between the motor and the switch, and an actuator in said chamber comprising a plunger, a guide tube disposed within the chamber in which the plunger is reciprocable, the plunger projecting from the chamber, means biasing the plunger in a downward direction, and an arm projecting laterally from the plunger and operatively associated with the switch for the actuation thereof.

2. The device of claim 1 in which the said switch comprises stationary contact means, a contactor having means biasing it toward the stationary contact means and opposed by the bias of said plunger, and a button connected with the contactor and engaged by said arm, whereby said plunger normally holds the said switch open, the switch being self-biasing to close the circuit to said motor when said plunger is moved from the position to which it is biased.

3. The device of claim 2 in which the plunger has an exposed portion adapted to be engaged by the rim of a receptacle, said shell having means for the support of the bottom of such a receptacle in a position in which the receptacle rim will hold the plunger elevated from the said downward position and at a level such as to permit the switch to close subject to its own bias.

4. In a device of the character described including a shell unitarily comprising a base, a column rising above the base, and a motor housing offset laterally from the column, a receptacle support carried by said shell below the motor housing, a plunger disposed in a normally advanced position beside the column and above the receptacle support, the said plunger having its lower margin formed to engage the rim of the receptacle to be elevated to a retracted position upon insertion of the receptacle on said support, means guiding the plunger for reciprocation between its advanced lower position and its retracted elevated position, an arm connected with the plunger, and a switch having means biasing it toward a normally closed position and being provided with a pressure button for opening the switch, said button being disposed in the path of the arm to hold the switch open when the arm is in its said advanced position, the plunger being provided with means biasing it towards said advanced position, and a motor in the motor housing and provided with an extended armature shaft provided with mixing means disposed adjacent the column in a position to enter a receptacle carried by said support, the said motor being operatively wired for control by said switch to be energized when a receptacle is marginally engaged with the plunger and disposed on said support.

5. The device of claim 4 in which the shell comprises two complementary parts having means connecting them for unitary handling, the said parts having complementary margins in mating engagement adjacent a median plane common to the column and the motor housing, the said motor and switch being mounted in the shell and fully exposed when said parts are separate.

6. In a device of the character described, a mixing shaft having a driven end and a free end, the said shaft having portions of progressively smaller cross section decreasing from its driven end toward its free end and having abrupt shoulders defining said portions and adapted for the centrifugal discharge of material tending to creep along said shaft toward the driven end thereof.

7. In a device of the character described, a whipping tool comprising the combination with an upright shaft, of a pair of buttons mounted on the shaft at axially spaced points, each of said buttons comprising radial vanes, the vanes of the uppermost of said buttons being substantially planiform, and the vanes of the lower of said buttons being axially offset, the vanes of each of said buttons being substantially at like level at their leading and trailing margins, whereby their lack of pitch produces, when rotated in a liquid, currents which are substantially radial to the substantial exclusion of axial components, the offset of the vanes of the lower button being adapted to produce stronger radial currents than result from the vanes of the upper button, the lower button being near the end of the shaft.

8. The device of claim 7 in which the respective buttons each have in plan the form of a Maltese cross.

9. A device of the character described comprising the combination with a mixer and a motor operatively connected therewith for the actuation thereof, of a receptacle support, a switch actuator above the support comprising a portion engageable by the rim of the receptacle on the support, means mounting the actuator for movement through a substantial range to and from the support, a switch having relatively fixed and movable contacts and means biasing the movable contact toward a closed position in contact with the fixed contact, a switch operating button connected with the movable contact and operable for the opening thereof in opposition to said biasing means, and motion-transmitting means connected with said actuator and movable to and from engagement with said button, said actuator having means biasing it in a direction to displace said button and open said movable contact when said motion-transmitting means engages said button near the extreme of movement of said actuator in said direction, the bias on said last mentioned means being sufficiently great to overcome that on said movable contact, and the said range of actuator movement against its bias being greatly in excess of that required for disengagement of said motion-transmitting means from said button, whereby said button is released to permit the closing of the switch in the initial displacement of said actuator upon engagement of a receptacle rim therewith.

10. In a device of the character described, a mixing shaft adapted to be centrally positioned in a container and having a driven and a free end, said shaft having portions of differing cross section with shoulders defining said portions, said shoulders having abrupt intersections with the shaft toward its free end to stop the upward current of mix along the shaft.

11. A motorized mixer having a motor and drive shaft mounted in position to support and drive a mixing shaft adapted to be projected into a container having mixable fluid materials therein, a mixing shaft connected to the motor shaft and revoluble for high speed mixing operation, said mixing shaft having a driven end and a free end with a mixing button adjacent the free end, said mixing shaft having a generally tapering configuration from its driven end to the free end to provide a progressively smaller cross section toward said button, abrupt annular shoulders at spaced points along said generally tapering configuration and adapted for centrifugal discharge of fluid material tending to creep along said shaft toward the motor.

12. In a device of the character described, a mixing shaft having a driven end and a free end, the said shaft having portions of progressively smaller cross section decreasing from its driven end toward its free end and having abrupt shoulders defining said portions and adapted for the centrifugal discharge of material tending to creep along said shaft toward the driven end thereof, said shaft being provided at its free end with a mixing tool and provided with a second mixing tool having a substantially planiform lower face, said second mixing tool being engaged with one of said shoulders near the tool first mentioned and in axially spaced relation thereto.

13. A shell for a device of the character described comprising in two complementary hollow parts of substantially like depth, a base, a column and a motor housing adjacent the top of the column and projecting laterally therefrom, the said parts having complementary mating margins and means at spaced points on said margins for connecting said parts together for unitary handling, one of said parts being provided internally with motor mounting means and switch mounting means, the other of said parts having motor enclosing and switch enclosing cavities, the said parts having between said cavities opposed projecting flange means constituting a switch actuating chamber, the said flange means being adapted to receive and confine a switch actuator in the assembly of said parts.

14. In a device of the character described, the combination with a hollow shell comprising first and second parts marginally connected along generally upright lines and unitarily comprising a base, a standard rising from the base, and a motor housing carried at the top of the standard and overhanging a portion of the base, the first part having an interior cavity substantially wholly exposed upon the separation of said parts and provided with an apertured motor mounting and an integral internal switch support, a motor and switch respectively carried by said mounting and support on said first part and enclosed by the second part, the motor having screws engaged in the apertures of said motor mounting, means connecting the parts for unitary handling, a switch actuator support with which said shell is provided, and a work operable plunger yieldably mounted on said last support and having motion transmitting connections for the actuation of the switch, the switch including an operating button engaged by said connections.

W. ARTHUR ERNST.

REFERENCES CITED

The following references are of record in the file of this patent:

UNITED STATES PATENTS

| Number | Name | Date |
|---|---|---|
| 1,592,601 | Hines | July 13, 1926 |
| 1,729,966 | Robinson et al. | Oct. 1, 1929 |
| 1,982,059 | Lawler | Nov. 27, 1934 |
| 2,294,489 | Terry | Sept. 1, 1942 |
| 2,304,476 | Poplawski | Dec. 8, 1942 |
| 2,477,150 | Snyder et al. | July 26, 1949 |